MAGNETIC TRANSDUCER

Filed Sept. 22, 1966

INVENTORS:
Keith O. Johnson
David Paul Gregg

By Keith D. Beecher

ATTORNEY

United States Patent Office 3,480,736

Patented Nov. 25, 1969

3,480,736

MAGNETIC TRANSDUCER

Keith O. Johnson and David Paul Gregg, Los Angeles, Calif., assignors to Gauss Electrophysics, Inc., Los Angeles, Calif., a corporation of California Filed Sept. 22, 1966, Ser. No. 581,365
Int. Cl. G11b 5/12
U.S. Cl. 179—100.2 5 Claims

ABSTRACT OF THE DISCLOSURE

An electromagnetic record head is provided for use in conjunction with a magnetic tape, for example, and which includes first and second core sections of dissimilar materials. The core sections have a common portion which defines an air gap, and a non-magnetic electrically conductive shim is positioned in the air gap. A high frequency bias winding is mounted on one of the core sections, and this core section is composed, for example, of a relatively soft ferrite material which exhibits desirable low loss characteristics and low reluctance to the high frequency magnetic flux produced by the high frequency bias winding. An intelligence winding is mounted on the other core section. The latter core section, for example, is composed of a suitable magnetic material exhibiting high permeability and low reluctance to the low frequency magnetic flux produced by the intelligence signals. The magnetic tape is drawn across the latter core section rather than the former, because the material of the latter exhibits much better wearing properties than the ferrite.

The improved transducer of the present invention is constructed to incorporate a dual magnetic core assembly. This permits the long wearing properties of a metal magnetic core to be utilized, in a manner to be described, without impairing the operation of the transducer due to high losses in the core when a high frequency bias signal, for example, is used.

Copending application Ser. No. 454,433, filed May 10, 1965, now abandoned, discloses a record head which includes a conductive gap in its core structure. A high frequency alternating current bias signal is applied to the head through a winding separate from the winding supplying the information signals. The high frequency bias signal sets up eddy currents in the conductive gap, and these high frequency eddy currents, due to skin effects, and as fully described in the copending application, create bias signal fields of a strength and configuration so as vastly to improve the operating characteristics of the head.

The improved transducer of the present invention may be constructed to incorporate the teachings of the copending application, and the resulting transducer assembly of the present invention exhibits all the desired characteristics of the head described in the copending application plus long wearing capabilities of its magnetic circuit as it is engaged by the magnetic tape.

The magnetic transducer assembly to be described includes a magnetic metal alloy core which may be composed, for example, of mumetal, or of similar metal alloys, including those presently designed by the trade names "Alfenol" or "Thermanol." This magnetic alloy core will be referred to herein as a "metal" core, and it has long wearing properties.

The transducer head of the present invention is constructed so that the aforesaid "metal" core is slidably engaged by the magnetic tape, as the head performs its recording or reproducing function, forming a bearing surface for the tape. This core is composed of a material, as mentioned above, capable of exhibiting long wearing properties as the magnetic tape moves across it.

Magnetic transducer assemblies constructed entirely of a metal core, such as described above, are ideal from a wear aspect. However, such metal cores exhibits excessively high losses, for example, when used in conjunction with high frequency signals. Metal cores, for example, are not suitable for use in the type of head described in the copending application when the bias signal is in the high megacycle frequency range.

In accordance with the concepts of the present invention, a second magnetic core composed, for example, of ferrite, or other low loss magnetic material, is positioned within the area circumscribed by the metal core, and in intimate contact with the pole pieces of the metal core.

However, the ferrite core is in a position such that it is not engaged by the magnetic tape. The ferrite core does not have the long wearing properties of the metal core. However, since the ferrite core is not contacted by the tape, its poor wearing capabilities are immaterial insofar as the long operational life of the transducer assembly of the invention is concerned.

As will be described, the improved magnetic transducer assembly of the invention is constructed so that the ferrite core is in intimate contact with the pole pieces of the metal core. Each of the two cores defines a gap and the two gaps are aligned to form a single common gap. This common gap can be filled with electrically conductive non-magnetic material, such as described in the copending application.

The information signal winding of the transducer of the invention is wound on the metal core. When the transducer is used, for example, to record audio signals, the frequency range of the information signals is relatively low. The flux produced by these signals passes, therefore, entirely through the metal core which exhibits high permeability and low reluctance to such signals.

The bias signal winding, on the other hand, is wound on the ferrite core, and the flux produced by a high frequency bias signal passes entirely through the ferrite core which exhibits low losses and a relatively low reluctance to the bias flux.

It will be appreciated, therefore, that in the improved magnetic transducer assembly of the present invention, the high frequency bias signal is applied to the winding of the low loss ferrite core, and the information signals are applied to the winding of the high permeability metal core.

A high frequency bias signal is used to improve the operation of the magnetic transducer assembly, when a conductive gap is used as taught in the copending application. However, the flux due to the bias signal does not pass through the metal core except at the pole tips. Thus, a flux profile resembling a sharply focussed beam can be generated, as fully described in the copending application, and particularly where smaller gaps are required at the very short wave lengths.

In addition, when the improved construction of the magnetic transducer assembly of the invention is used, a much smaller amount of the bias signal appears in the information signal windings, thus obviating the need for extraneous bias signal traps, or the like.

It also follows that high efficiency and high quality factors are possible in the bias circuitry associated with the improved head of the present invention. This helps to eliminate even order harmonics in the bias wave form which tend to create noise in the magnetic recording.

It should be noted that the improved magnetic transducer assembly of the invention can also be used for high freqeuncy reproduction of video signals, for example. In such applications, very high frequency signal reproduction is required, and the losses in an all-metal core are high and create noise. This noise can be detrimental to the dynamic range of the transducer. Ideally, of course, an all-ferrite core is desirable for video signal recording so as to reduce losses and head noise.

However, as outlined above, the wear properties of ferrite are poor, and its permeability is very low. The low permeability of the ferrite core seriously affects its low frequency response. The dual core construction of the head of the present invention permits a natural flux cross-over to occur because of the characteristic losses and ratio of permeabilities in the two cores.

For example, at the lower frequencies, the lowest reluctance path is around the high permeability metal core. As the frequency increases, the losses in the metal core become greater, and the reluctance increases because of the losses. As the frequency is still further increased, the flux path is through the low loss ferrite core which now exhibits lower reluctance than the metal core. This cross-over results in improved head efficiency and reduced noise.

Figure 1:
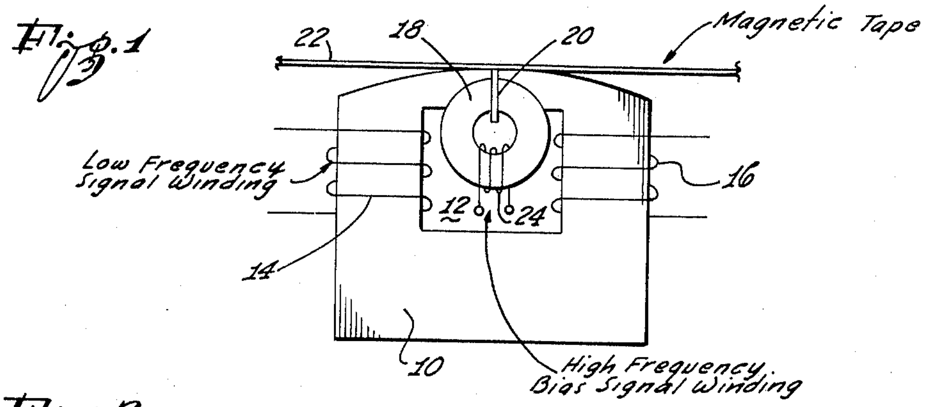
FIGURE 1 is a schematic representation of a magnetic transducer assembly constructed in accordance with one embodiment of the invention.

As shown, for example, in FIGURE 1, the improved magnetic transducer assembly of the invention includes a first magnetic core 10. The core 10 is a "metal" core, and it is configured to circumscribe an enclosed area 12. The metal core 10 may be composed, for example, of a mumetal, or of "Alfenol" or "Thermanol," as mentioned above. Information signal windings, such as the windings 14 and 16 may be wound on the metal core 10, as shown.

A second core 18 having an annular configuration in the illustrated embodiment, is positioned in the enclosed area 12 which is circumscribed by the core 10. The core 18 is in intimate contact with the core 10, as shown. The core 18 is composed, for example, of a ferrite material.

The metal core 10 and the ferrite core 18 define first and second gaps which are aligned so as to constitute a single common gap. A conductive non-magnetic member 20 may be positioned in the common gap, as taught in the copending application. A magnetic tape 22 is drawn across the head.

It will be appreciated that the magnetic tape 22 engages only the metal core 10. The metal core 10 forms a bearing surface for the tape, and it exhibits long wearing characteristics, properties which are not possessed by the ferrite core 18. However, as illustrated, the ferrite core is not engaged by the tape, so that its poor wearing properties are of no consequence.

As described above, the metal core 10 exhibits high losses at higher signal frequencies, but it has high permeability and low reluctance at the lower signal frequencies.

The ferrite core 18, on the other hand, exhibits low losses at the higher signal frequencies, but it has relatively low permeability and exhibits relatively high reluctance at the lower signal frequencies.

A bias signal winding 24 may be wound on the core 18. When a high frequency bias signal is introduced to the winding 24, the resulting flux passes almost entirely through the core 18, and does not pass through the metal core 10, except at the pole tips. The low frequency components of the information signal flux, on the other hand, pass through the low reluctance core 10.

Also, and as described above, when the information signals through the windings 14 and 16 have high frequency components, these high frequency components tend to pass through the ferrite core 18, rather than around the core 10, so that a natural flux cross-over condition is realized. This results in improved head efficiency and reduces noise, so that the head can be used to advantage for recording or reproducing signals extending through an extended frequency range.

Figures 2, 3:
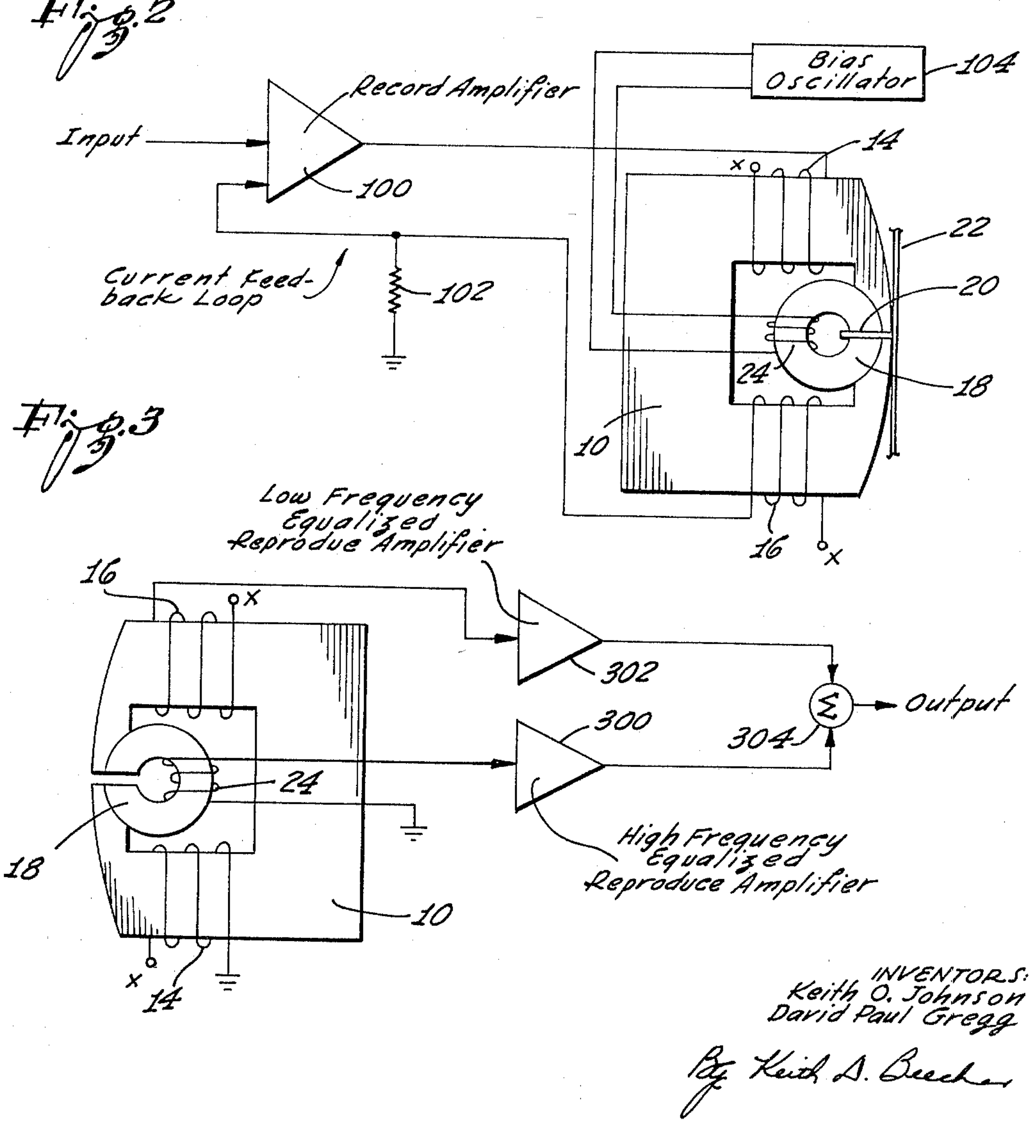
FIGURE 2 is a circuit diagram showing the improved magnetic transducer assembly of the invention incorporated in a recording circuit.
FIGURE 3 is a circuit diagram showing the improved transducer assembly of the invention incorporated in a reproduce circuit.

In the recording circuit of FIGURE 2, a record amplifier 100 is connected to the winding 14 of the transducer assembly. The winding 14 is connected in series with the winding 16, the latter winding being connected back to the record amplifier 100 in a current feed-back loop. A grounded resistor 102 is disposed in the loop, so as to provide the desired feed-back signal. The high frequency bias signal is derived, for example, from a bias oscillator 104, and is introduced to the bias signal winding 24.

When the magnetic transducer assembly is used in its reproduce mode, it may be connected into a reproducing circuit, such as shown in FIGURE 3. In the latter mode, the winding 24 on the ferrite core 18 is connected to a first reproduce amplifier 300, whereas the windings 14 and 16 are connected in series, and to a second reproduce amplifier 302.

The amplifier 300 is a high frequency equalized reproduce amplifier, and it reproduces the high frequency signal components derived from the core 18. The amplifier 302, on the other hand, is a low frequency equalized reproduce amplifier, and it reproduces the low frequency signals derived from the core 10.

The outputs from the amplifiers 300 and 302 are summed in an appropriate summing circuit 304, and the resulting output from the summing circuit is fed to a utilization network.

It will be appreciated that the transducer assembly, when used in the reproduce circuit of FIGURE 3, is capable of responding with high fidelity and high efficiency to signals extending through an extended frequency band.

While a particular embodiment of the invention has been shown and described, modifications may be made.

What is claimed is:

1. A magnetic transducer including: first and second magnetic core sections having a common portion defining an air gap, said first magnetic section exhibiting relatively low magnetic reluctance at relatively low signal frequencies and relatively high losses at relatively high signal frequencies, and said second magnetic core section exhibiting relatively low losses and relatively low magnetic reluctance at relatively high signal frequencies and relatively high losses at the relatively low signal frequencies; a non-magnetic conductive shim member mounted in said air gap; a high frequency bias signal winding mounted on said second core section and responsive to a high frequency bias signal applied thereto to establish high frequency magnetic flux in said second core section to create high frequency eddy currents in said conductive shim, said second core section exhibiting relatively low reluctance and low losses to said high frequency magnetic flux; and an intelligence signal winding mounted on said first core section and responsive to information signals in a signal frequency range relatively low with respect to the frequency of said bias signal to produce low frequency magnetic flux in said first section, and with said first section exhibiting high permeability at low reluctance to said low frequency magnetic flux, so that essentially all the low frequency magnetic flux due to said information signals passes through said first section and essentially all the high frequency magnetic flux due to said high frequency bias signal passes through said second section, whereby said high frequency bias signal creates a sharply focused magnetic flux profile across said gap.

2. The magnetic transducer defined in claim 1, in which said first core section is composed of material exhibiting relatively high wearing properties, and said second magnetic core section is composed of material exhibiting relatively low wearing properties.

3. The magnetic transducer defined in claim 1, in which said second core section is composed of a ferrite material.

4. A magnetic transducer including: a first magnetic core shaped to define a circumscribed area and to provide a bearing surface for a magnetic tape, said first magnetic core being composed of material exhibiting relatively long wearing properties but relatively high losses at relatively high magnetic flux frequencies and relatively low reluctance at relatively low magnetic flux frequencies, said first magnetic core defining a gap; a second magnetic core disposed within the area circumscribed by said first core and in intimate contact with the portions of said first core defining said gap, said second core defining a further gap aligned with the gap defined by said first core, said second core being composed of material exhibiting relatively low losses at the relatively high magnetic flux frequencies and relatively high reluctance at the relatively low magnetic flux frequencies; an electrically conductive non-magnetic shim disposed in the aligned gaps of said first and second cores; a high frequency bias signal winding mounted on said second core and responsive to an applied high frequency bias signal for creating a high frequency magnetic flux in said second core; and a signal winding mounted on said first core and responsive to information signals in a frequency range low with respect to the frequency of said high frequency bias signal for creating low frequency magnetic flux in said first core, whereby the high frequency bias magnetic flux in said second core is contained almost entirely in said second core and sets up eddy currents in the aforesaid conductive shim to create a bias magnetic flux across the aligned gaps of a sharply focused profile.

5. The magnetic transducer assembly defined in claim 4, in which said magnetic core is composed of a ferrite material having relatively low wearing properties, and said first core is composed of a magnetic metal.

References Cited

UNITED STATES PATENTS

| | | | |
|---|---|---|---|
| 2,660,622 | 11/1953 | Field et al. | 179—100.2 |
| 3,171,903 | 3/1965 | Wheeler et al. | 179—100.2 |
| 3,303,292 | 2/1967 | Bedell et al. | 179—100.2 |
| 3,372,243 | 3/1968 | Schuller | 179—100.2 |

FOREIGN PATENTS

| | | |
|---|---|---|
| 925,318 | 3/1955 | Germany. |

STANLEY M. URYNOWICZ, Jr., Primary Examiner

R. S. TUPPER, Assistant Examiner